Sept. 20, 1960  R. J. HERBOLD  2,953,742
GEOPHYSICAL PROSPECTING APPARATUS
Filed Sept. 4, 1957
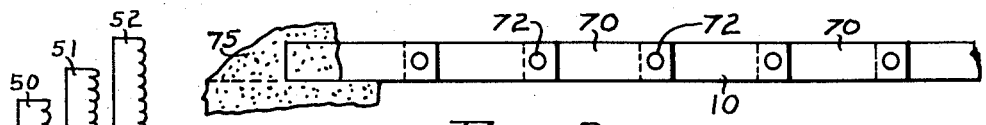
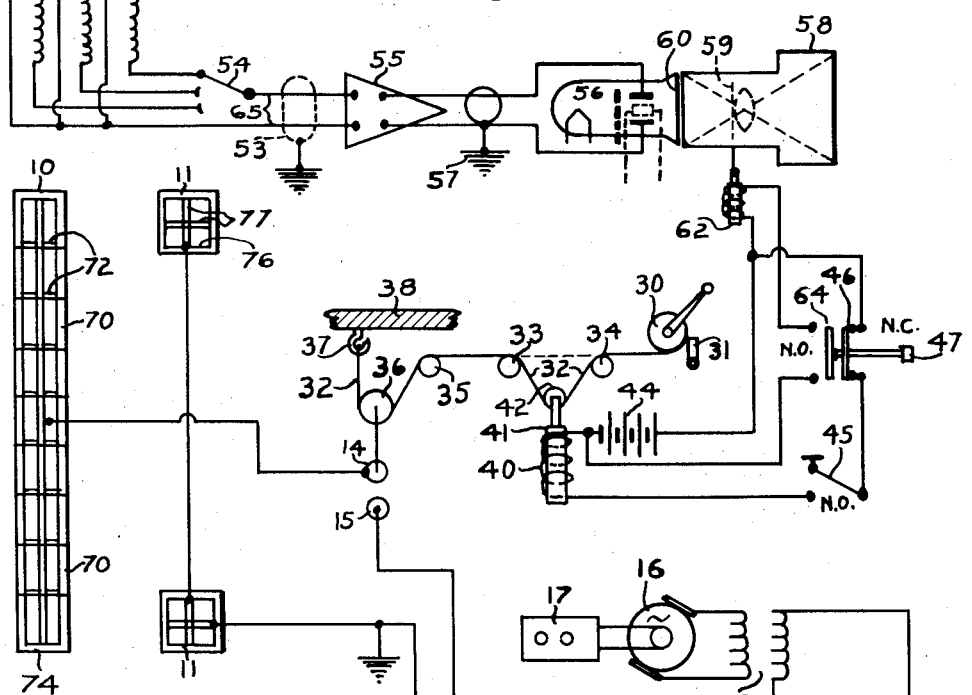
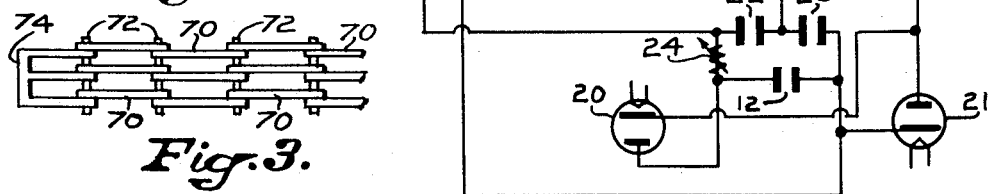
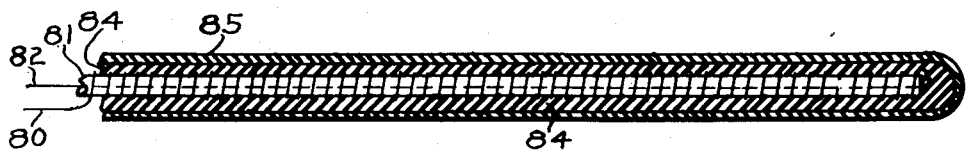
INVENTOR.
Robert J. Herbold
BY
Clayton L. Jenks
ATTORNEY

United States Patent Office 2,953,742
Patented Sept. 20, 1960

2,953,742

GEOPHYSICAL PROSPECTING APPARATUS

Robert J. Herbold, Denver, Colo.; Charles J. Hughes, administrator of Lafayette M. Hughes, deceased, assignor of one-third each to said Charles J. Hughes, William E. Hughes, and Lafayette M. Hughes, Jr., as tenants in common Filed Sept. 4, 1957, Ser. No. 682,037

5 Claims. (Cl. 324—6)

This invention relates to a geophysical prospecting apparatus, and it pertains primarily to an improvement over the disclosure of my prior Patent #2,660,703 of November 24, 1953.

In accordance with this method, a descending electromagnetic wave is initiated within the earth close to the earth-air boundary surface, and return waves resonantly generated within or reflected from various earth strata are received by means of a receiver antenna near the earth's surface and their pattern is indicated on the screen of an oscilloscope governed by the receiver. The descending wave front is initiated by discharging a spark as an electrical pulse into a substantially horizontal earth antenna between two spaced antenna terminals. These terminals have been made by means of short lengths of leaky hose carrying water which are arranged in parallel to form spaced bands of a shallow depth of wet earth separated by the comparatively drier earth forming the antenna. An improper handling or arrangement of the hose, and particularly a flow of too much water onto the earth surface, might cause short-circuiting rivulets of water between the terminals or other disadvantages and thus interfere with the operation of the apparatus.

One object of my invention is to provide a satisfactory form of antenna terminal which is flexible and will conform with the shape of the earth surface, whether rock or loose earth, and which will provide a rectangular or other shape of earth antenna therebetween of predetermined dimensions best suited for the locale.

As set forth in my patent, the return signal waves are received by a helical antenna coil connected to govern an oscilloscope, and characteristic wave patterns related to the subterranean strata are formed on the screen and photographed. For this purpose, the sweep of the oscilloscope is so adjusted initially, while the spark pulse is being discharged to produce return wave images, that all of the return signal waves may be portrayed at one time. Then, adjustment of the sweep is made prior to taking each picture so that a different portion of the return waves may be separately and serially portrayed on the screen and photographed. To avoid mistakes, it is desirable that the spark control and the camera shutter operation be coordinated so that the series of pictures may be readily taken.

A further object of the invention is to provide a connection between the photographing camera and the operating parts of the spark discharging apparatus which insures that a picture may be taken substantially automatically and the operator is free to give his full attention to the various electrical controls.

Another object is to provide controls for the spark gap spacing which permit setting up the apparatus for optimum results prior to taking the needed photographs of the return signal waves and which will space the spark terminals for preliminary tests and subsequently provide for automatic firing of the condenser discharge at the time of opening the camera shutter for taking the picture.

Although I do not wish to be limited to any theories underlying the operation of this apparatus, it is my present belief that the spark discharge pulse or surge initiates a vertically descending wave front, the narrow central portion of which may be considered as a directed beam subject to attenuation under the inverse square law. Various subterranean formations, such as water, oil, sand and statified rock, selectively reflect the transmitted waves, or waves selectively initiated by the beam are re-radiated, and the vertically ascending portion thereof cuts the helical coils of the receiver and develops an oscillating current which governs the amplitude of movement of the oscilloscope spot as it is drawn forward by the regulated sweep. Since the subterranean formations are selective as to the frequencies or wave lengths which they return, the return signal curves are related to and portray the variations in structure in the strata. The spark discharge wave front is considered to comprise a wide band of wave lengths or frequencies and the various strata to be resonant to different frequencies and to return their own selected frequency waves. Each portion of an observed signal pattern having similar characteristics refers to one or more strata or to an earth formation having common qualities. Identical formations give the same type of characterizing signals, although they may be influenced or varied by other formations. For example, fresh and salt water develop on the oscilloscope screen zig-zag curves of ascending and descending amplitude characteristics. The shape of the return signal waves from an oil bearing formation is related to the fact that oil is a homogeneous body which is non-conductive and a di-electric. Its identifying return signal develops on the oscilloscope screen a continuous wave curve of equal amplitude, whereas water and various rock formations develop signals of varying amplitude, so that they should be readily distinguishable.

I have observed that various subterranean strata differ in their signal selecting and transmitting qualities, in that some formations may return one given range of signal frequencies better than another range, as is shown by the visual record on the screen. Hence they may be selectively received. Often the return signal waves have such short wave lengths and high frequencies that the amplitude curves on the screen are so closely spaced that the signal pattern is blurred or highly confusing and unintelligible. This makes it difficult to distinguish the sought-for equal amplitude curve from those representing other formations. Also, if the waves shown on the screen are too widely spaced or stretched out lengthwise of the oscilloscope sweep axis and adequate correction cannot be made by adjusting the sweep, it again may be difficult to interpret the received signals, and particularly since an observed curve on the screen might portray characteristics of a wide depth of several strata.

A further object of the invention is to provide an apparatus which will portray the curves characterizing oil and enough other formations as will give a clear and intelligible oscilloscope screen pattern of the earth formations.

I find that the wave reception by a receiver antenna having a helical coil depends upon the number of turns in the coil and that coils of different numbers of turns each have an optimum selective resonance to a limited band or number of wave frequencies. The pattern of the wave is not affected by the number of coil turns. Since each type of subterranean strata transmits best a given range of frequencies and this often differs materially from the transmission in another locality, the receiver antenna should be resonant to or capable of picking up a desired signal or range of frequencies. When one is prospecting for only the equal amplitude oil signal, it is largely immaterial what other signals are observed, except as they give desired information as to the subterranean formations, including water and salt. Hence, I select that receiver coil of an optimum number of turns which is resonant to the oil signal waves and only enough of other informative signal curves as will give a clear oil signal and avoid having a crowded or unintelligible pattern. That is, the receiver coil should pick up only such return waves identifying the oil and important features of the terrain which provide an easily read screen pattern. The receiver coil should not select so many return waves as to form a crowded and confusing wave pattern, and unimportant formations may be ignored.

Hence, I provide a group of helical antennas of widely different numbers of turns and I select that receiver coil which is resonant to important return waves, so the oscilloscope screen with an optimum sweep regulation will show distinctive features of the terrain and differentiate between the oil and other strata for a clear interpretation, but which does not select so many waves as to form a crowded and confusing wave pattern.

A further and primary object of this invention is, therefore, to provide a set of receiver antennas which may be selectively connected to the oscilloscope for transmitting desired return signal waves thereto and which are so constructed and arranged that if one gives a blurred or unintelligible image, another may be selected to provide optimum results.

Referring to the drawings which pertain to my improvements over the structure of said prior patent and to which reference may be had for further disclosure:

Fig. 1 is a diagrammatic showing of the transmitting and receiver systems of the apparatus;

Fig. 2 is a fragmentary elevation of a sending antenna terminal;

Fig. 3 is a top plan view of a portion of the same; and

Fig. 4 is a fragmentary section of a receiver coil.

The drawings show a preferred form of apparatus comprising a system for developing a high energy spark pulse and inserting it into an earth antenna to form a downwardly descending electromagnetic wave front and a receiver system having one of a multiple set of receiver coils so connected with an oscilloscope as to portray on its screen a series of wave curves associated with and identifying various strata formations below the earth's surface. This apparatus comprises a set of spark discharging antenna terminals 10 and 11 which are so arranged in spaced locations that the horizontal earth portion therebetween and immediately below the earth-air boundary constitutes the antenna for transmitting a downwardly descending electromagnetic wave front. The wave is formed by discharging a suitable capacitor or condenser bank 12 between spark gap terminals formed by the separable metal spheres 14 and 15 which are so controlled that a single spark pulse may be discharged between the terminals.

The condenser bank is made up of a series of separate condensers of required capacity which are suitably charged, such as by means of an alternating current generator 16 driven by a gasoline motor 17. The secondary step-up transformer 18 is so constructed as to provide a high voltage of at least 10,000 volts, and preferably 40,000 volts or more, sufficient for charging the condenser bank. The capacity of the condenser bank 12 is preferably at least 1 microfarad, but it may be 10 or more microfarads. A satisfactory return signal is usually obtained by discharging a condenser of one microfarad capacity at 40,000 volts. To charge the condenser, I may employ two standard diode rectifiers 20 and 21, preferably arranged reversely in a full wave doubler circuit whereby two condensers 22 and 23 are alternately charged to the transformer peak voltage. An adjustable resistance 24 is so located in the circuit as to prevent overloading the rectifiers and limit the rate of charging the condensers. These condensers in turn serve to charge the condenser bank 12. As shown, one terminal of the condenser bank 12 is connected with the two spaced antenna terminal plates 11, and the other condenser terminal is connected with the spark gap sphere 15, so that when the spark gap is broken down the energy may be transmitted through the gap sphere 14 to the other terminal plate 10. Thus the electrical energy transmitted to the terminal plates 10 and 11 is required to be dissipated in a substantially sheet form of earth antenna formed by the comparatively dry earth between the terminals 10 and 11. The circuits may be as illustrated in my prior patent and need not be further described.

The upper ball 14 of the spark gap may be manually adjusted in position by means of a suitable hand operated windlass 30 and controlled by a pawl and ratchet 31. The windlass carries a cord 32 passing over two pulleys 33 and 34 and thence over a pulley 35 and beneath a movable pulley 36 which supports the ball 14 of the spark gap. The end of the cord 32 is suitably secured, as by means of a hook 37 affixed to a roof support 38 of the truck on which the apparatus is mounted. Thus, by means of the windlass, the spark gap spheres 14 and 15 may be spaced apart at a suitable distance to prevent any discharge of the condensers. Also, the windlass may be so adjusted as to bring the gap spheres close enough to provide a succession of sparks, whereby the oscilloscope screen may be viewed repeatedly to determine what adjustments are to be made and which antenna is to be selected.

To provide for a controlled discharge of the condenser bank, the upper spark gap sphere 14 may be held remote from the lower sphere 15 by means of a solenoid 40 which has its plunger 41 connected to a pulley 42 around which the cord 32 passes. Thus, when the solenoid plunger is pulled down, the cord, as shown by the full line in the figure, serves to raise the upper spark gap ball 14 to a position remote from the lower ball 15. The solenoid of suitable construction may be energized by a battery 44, the circuit of which is held open by the normally open switch 45. A normally closed switch 46 in the battery circuit is suitably held closed, as by a spring, and may be opened by means of the plunger 47. The switches may be interconnected for the purpose. By closing the two switches 45 and 46, a separation of the spark gap terminals is caused, and this prevents a discharge of the condenser bank. If, however, the switch plunger 47 is pushed inwardly after the two switches have been closed, then the solenoid 40 will be de-energized and the weight of the ball 14 and associated parts, which may be supplemented by a spring if desired, will cause the cord 32 to assume the dotted line position of Fig. 1 and bring the balls 14 and 15 together, so that a spark will be discharged through the gap.

The signal receiver system comprises one of the antennas 50, 51, 52 suitably shielded and grounded, as at 53, which may be selectively chosen and inserted into the circuit. They are shown as connectable through the movable switch arm 54 with the amplifier 55 which is arranged to transmit an amplified receiver current to the oscilloscope 56. Suitable precautions may be taken to shield and ground the various wire systems, such as by connecting the amplifier and oscilloscope through a grounded co-axial cable 57. The amplifier is preferably constructed to provide a clipper or limiter circuit so arranged that the amplifier may pick up a strong oscillating wave signal but with the amplitude limited to prevent injury to the oscilloscope. Other suitable constructions, such as the various features described in said patent or which are well known to those skilled in the art, may be employed.

A camera 58 is employed to photograph the oscilloscope image. The camera is located in a light tight relationship with the screen 60 of the oscilloscope. One feature of the invention comprises opening the shutter 59 of the camera just prior to the discharge of the spark gap. To this end, the cable for releasing the camera shutter may be suitably connected to a solenoid 62 so arranged that when energized it will push the cable to open the shutter. The solenoid 62 is connected to be energized by the battery 44 at a time when the other solenoid 40 is de-energized. That is, the plunger 47 is connected to close a further switch 64 and make a circuit between the solenoid 62 and the battery 44 at the time when the circuit to the solenoid 40 is broken by opening the switch 46. Thus the spark gap balls are allowed to come together and discharge the condenser bank preferably immediately after the solenoid 62 has opened the shutter. These parts may be so arranged that returning the plunger 47 to the inoperative position shown in Fig. 1 will cause the solenoid 62 to be re-energized and the shutter closed. The camera may be of the "Land Polaroid" type which permits development of the picture on the scene so that the operator may determine quickly whether he has obtained the proper results.

One form of sending antenna terminal 10 is shown in Figs. 2 and 3. This comprises a reticulated and jointed or hinged metal mat which may be 10 to 20 feet long and 4 to 6 inches wide. It is laid on ground of any roughness or shape and will make an electrical contact therewith substantially throughout its full length. The terminal mat may be made of a set of laterally spaced bars 70 of iron or other conductive substance pivotally connected by pins 72 and arranged in parallelism and staggered as shown in Fig. 3. The end members of the jointed frame may be welded together in a forked or U-shaped construction 74 or otherwise shaped for convenient use. It will be appreciated that this framework may be folded into a short zig-zag length. In order to make a full electrical contact with the earth, the entire terminal framework 10 may be covered with earth 75 to a slight depth, as shown at the left in Fig. 2, so that the mat will be in intimate association with earth material and the antenna between the terminals 10 and 11 will be a part of the earth beneath the earth-air boundary. A small amount of water may be sprinkled onto the covering earth to insure a full electrical contact therewith. The two small terminal plates 11 may be similarly made but without the joints and hinge pins. Each plate 11 is shown as a square, rigid framework of iron 76 having two cross bars 77 welded together to make a short electrode mat having an open spacing within which dirt may be piled in place. The bars of both frames may be narrow and light, such as ¼ inch bar iron having a vertical width of 1 inch.

Each receiving antenna may be as described in my prior patent. One form is shown in Fig. 4 as comprising a length of fine insulated copper wire 80 wound in a single layer of turns as a helix co-axial with one end portion of the wire and suitably supported by a central di-electric tube 81 through which an inner straight length 82 of the wire passes. The wire may be made of a #30 (0.012" diameter) copper wire, but I may use other materials and desired sizes, such as #20 and #40. The wire may be provided with enamel or other suitable insulation, so that it may be wound closely on the central core 81. The entire terminal may be 3 or 4 feet in length and the helix of wire may comprise various lengths, such as from 250 to 500 feet or more. The wire may be coated with or embedded in an insulating mastic 84, and if desired, an outer sheath 85 may be added to insure adequate protection both against stray ground currents and water. The construction is shown exaggerated in size in the figure, but it is ordinarily about 5/16" in diameter and may have from 500 to 2000 turns of the helical coil. Such a wire coil has a low resistance and low impedance. This receiver is preferably so made that it is flexible and will readily conform with the shape of the ground. It is normally laid horizontally on the surface of the earth, and if desired, it may be covered with a thin layer of wet or dry earth. This insures that the vertically ascending return waves are received directly from the earth and do not have to cross the earth-air boundary before they cut the coil. Also, the coil is located close to the boundary so as to minimize its receiving any ground waves that may be traveling parallel with the earth surface.

Since a primary feature of this invention resides in selecting one of several antenna coils having widely differing numbers of turns and impedances, I make the coils with a wide latitude as to their dimensions and numbers of turns. I prefer that these antenna terminals be made of the same wire size but have a large number of turns as specified in the claims, which vary from 500 to 2000 or more. The voltage of the return signal current appears to be dependent on the number of coil turns cut by the return waves. The frequency band picked up by the coil is likewise dependent on the number of turns, in that the greater the number of turns, the higher are the frequencies picked up. Hence, the receivers are so constructed as to be selectively receptive to different ranges of frequencies. By way of example only, one antenna may have such a number of turns in its helical coil that it will be best receptive to waves of 20 to 100 kilocycles. Another may range from 75 to 250 kc. and still another may give optimum reception of waves from 200 to 500 kc. The overlapping frequency of range is to make sure that one of the antennas will receive the particular range of frequencies that is being returned. The various receiver antennas may have similar plug or socket terminals for connection with a correlated part in the amplifier circuit. This provides for easy interchangeability of the coils, so that any one may be selected from a stored group, and readily substituted for another, and only one coil needs to be handled at a time in setting up the apparatus.

While various types of oscillograph or oscilloscope may be employed, I prefer to use the "Tektronix" Type 535 oscilloscope, provided, for example, with a T51A cathode ray tube, which is now in standard use. This apparatus has a suitably calibrated, reticulated or ruled measuring screen which makes it easy to determine both the amplitude and the frequency of the received signal waves. The screen may be of the phosphor type and such as to provide an easily photographed path of the cathode ray spot. The device may be triggered by the spark discharge and otherwise operated according to standard practice. A camera is mounted in a light proof association with the screen so that a picture may be taken of the waves portrayed thereon. In practice, the sweep of the oscilloscope beam is so adjusted that both ends of an entire return signal wave structure may be viewed at one time. Then, by changing the sweep rate, only one-fifth of the signal may be seen at a time and by suitable adjustments each fifth of the signal waves may be separately shown and photographed. The five times expansion of the sweep rate does not affect the number of cycles per second but merely expands the curve longitudinally of the X-axis. The maximum permitted sweep adjustment may not give an intelligible signal for a given receiver coil. However, by changing the antenna coil, I may select those return waves of such frequencies as will best bring out clearly the desired signal of equal amplitude that characterizes oil. The oscilloscope may be variously controlled in its operation to give desired results, such for example, as might be had in successively expanding the amplitude of the curves on the screen as the five different pictures of successively lower strata are taken.

The different subterranean strata pass and do not return bands of certain wave lengths and each selectively returns some band of wave lengths. That is, the different earth formations transmit different bands of frequencies, although the equal amplitude oil signal appears to be returned with all of the various frequency bands. Hence, I select such frequency bands as will not crowd the oil signal but will leave it easily distinguished. The several antenna should, therefore, have such receptive characteristics that one will not only pick up the return waves but also give a general picture of the strata below the earth's surface without obscuring the desired oil signal waves. Hence, as above stated, I may employ three antennas receptive respectively, for example, to frequencies of 20 to 100 kilocycles, 75 to 250 kc. and 200 to 500 kc. or other frequencies. These may be selectively inserted into the receiver circuit. The mathematical values are not important, except as they designate operative ranges. By a preliminary inspection of the signal received when an initial spark pulse wave is sent downwardly, it can be quickly ascertained whether the curves of the return signal are spaced too far apart for intelligible interpretation, or are so close together that they are confusing.

It will be appreciated that the signal displayed on the screen portrays an arbitrary curve in which the X-axis refers to the sweep rate and the Y-axis gives the varying amplitude of the voltage of the return signal. The pattern or shape of the signal curves relative to the axis or line of movement of the oscilloscope cathode ray beam are dependent on the frequencies of the waves received from the earth strata. If the amplitude waves are so close together on the oscilloscope screen that only the general outline of the whole curve system can be seen, then obviously the desired oil curve of equal amplitude will not be readily found. Hence, in operation of the apparatus, one should ordinarily select that sweep rate which will show the entire signal on the screen at one time in a crowded condition. Then an increase of the sweep rate by five times will expand the signal lengthwise. If the signal curve is still crowded, then it is necessary to change the receiving antenna for one of lesser impedance or number of turns which selects the lower return wave frequencies. The desired oil signal of equal amplitude appears to be picked up by each of the antennas and the problem is one of selecting that antenna which picks up less of the other return waves. Hence, both by multiplying the sweep rate by the permitted number of times, depending on the capabilities of the instrument, and by selecting the required receiver antenna, it is possible to display such return waves on the screen as will readily emphasize the presence of the oil indicating waves of equal amplitude and provide an intelligible curve.

It is my belief that the selective wave reception by the chosen antenna coil depends upon the frequency of the return signal waves and the impedance of the receiver coil and its circuit, but it does not appear to be affected by the amplitude or signal strength. The antenna coils of different numbers of turns may be each resonant to a different band of frequencies so that by properly selecting a coil, I may either pick up or eliminate various frequency waves and thus permit the desired waves of equal amplitude to be readily distinguishable from the waves of other strata. Hence, I select that receiver coil which is resonant to or can select such return signal frequencies as give optimum and interpretable signals that do not crowd upon or confuse the oil signal waves of equal amplitude. The return voltage and amplitude of the oil signal may not be equal in two different area shots, but the presence of oil is recognized by the quality of equal amplitude, whatever may be its numerical value.

I claim:

1. Apparatus for geophysical exploration comprising a generator, a capacitor, adjustable spark gap terminals, terminals providing an earth antenna therebetween arranged to discharge said capacitor into the antenna and develop an electromagnetic wave front in the earth and initiate therein return waves which characterize subterranean formations, a circuit comprising a receiver antenna coil to be energized by said return waves and an oscilloscope governed by the receiver coil which has a screen for portraying a curve pattern related to the return waves, a camera having a normally closed shutter which is arranged to photograph the pattern, means to adjust the spark gap terminals to non-discharge positions and mechanism governed in a timed relation with movement of the spark gap terminals to create a spark which opens the camera shutter for photographing a return wave pattern initiated by the spark.

2. Apparatus according to claim 1 comprising an electric circuit including a spark gap controlling solenoid connected to hold the spark gap terminals apart, a solenoid connected to operate the camera shutter, and switch mechanism which causes said solenoids to open the camera shutter initially and thereafter produce a spark.

3. Apparatus according to claim 2 comprising manually adjustable mechanism which controls the setting of the spark gap terminals.

4. Apparatus for geophysical exploration comprising electrical apparatus for developing a high energy electrical pulse, two spaced antenna terminals substantially on the earth surface which provide a sheet-type of earth antenna therebetween, means to discharge said pulse between the terminals and initiate at the antenna primarily a descending wave front which in turn initiates ascending return waves characterizing subterranean strata, an oscilloscope for indicating a wave pattern related to the return waves and an electrical circuit governing the oscilloscope which includes an amplifier and a selected one of a set of receiver antennas of insulated wire shaped as a longitudinally extended helix of a large number of small diameter coil turns, said receiver antenna being horizontal and substantially on the earth surface so arranged as to be cut by the return waves beneath the earth-air boundary, and means for interchangeably connecting any of said antennas into said circuit, said set comprising an antenna having a large number of helix turns providing optimum clarity of high frequency return wave signals on the oscilloscope screen and an antenna having a lesser number of helix turns providing optimum clarity of lower frequency return wave signals and said set serving to receive all of the desired return waves with optimum clarity.

5. Apparatus for geophysical exploration comprising a generator and associated apparatus for developing a high energy electrical pulse, two spaced antenna terminals which lie substantially on the earth surface and provide therebetween a sheet type of earth antenna immediately beneath the earth air boundary, means for discharging said pulse to said terminals and into said earth antenna to initiate primarily a descending wave front in the earth and beneath said boundary, and means including a horizontal receiver antenna coil lying substantially on the earth surface close to but outside of said earth antenna, an amplifier and an oscilloscope for picking up a return wave initiated by said front and indicating a wave curve characteristic of subterranean geologic formations, one of the earth antenna terminals being a long narrow metal mat forming one side of the earth antenna and spaced from the opposite terminal to provide an earth antenna sized to dissipate the pulse, said mat being flexible to conform to the shape of the ground therebeneath and sized to insure an adequate electrical contact with the earth and being located substantially on the earth surface to minimize the formation of a laterally traveling wave.

References Cited in the file of this patent

UNITED STATES PATENTS

| | | |
|---|---|---|
| 1,803,405 | Ricker | May 5, 1931 |
| 2,291,596 | White | July 28, 1942 |
| 2,376,659 | Chireix | May 22, 1945 |
| 2,657,380 | Donaldson | Oct. 27, 1953 |
| 2,660,703 | Herbold | Nov. 24, 1953 |
| 2,661,466 | Barret | Dec. 1, 1953 |